(12) United States Patent
Pishdadian, Jr. et al.

(10) Patent No.: US 9,955,544 B1
(45) Date of Patent: Apr. 24, 2018

(54) AUTONOMOUS DISTRIBUTED LIGHTING SYSTEM

(71) Applicants: Hamid Pishdadian, Jr., Warick, RI (US); Thomas A. Spinelli, Staten Island, NY (US); Akram A. Khalis, Staten Island, NY (US)

(72) Inventors: Hamid Pishdadian, Jr., Warick, RI (US); Thomas A. Spinelli, Staten Island, NY (US); Akram A. Khalis, Staten Island, NY (US)

(73) Assignee: North American Manufacturing Enterpizes, Staton Island, NY (US)

( * ) Notice: Subject to any disclaimer, the term of this patent is extended or adjusted under 35 U.S.C. 154(b) by 0 days.

(21) Appl. No.: 15/422,496

(22) Filed: Feb. 2, 2017

(51) Int. Cl.
*H05B 37/02* (2006.01)
*H05B 33/08* (2006.01)
*H04L 29/08* (2006.01)
*H02J 9/04* (2006.01)

(52) U.S. Cl.
CPC ............ *H05B 33/0854* (2013.01); *H02J 9/04* (2013.01); *H04L 67/125* (2013.01); *H05B 37/0218* (2013.01); *H05B 37/0281* (2013.01)

(58) Field of Classification Search
CPC ............ H05B 33/0854; H05B 37/0218; H05B 37/0281; H02J 9/04; H04L 67/125
USPC .......................................................... 315/152
See application file for complete search history.

(56) References Cited

U.S. PATENT DOCUMENTS

| 9,750,114 | B2* | 8/2017 | Ashdown | ............ H05B 37/0272 |
| 2004/0212324 | A1* | 10/2004 | Callahan | ................ H05B 37/02 315/312 |
| 2010/0141153 | A1* | 6/2010 | Recker | ............... H05B 33/0803 315/149 |
| 2010/0206050 | A1* | 8/2010 | Biallas | ................ B28B 17/0072 73/38 |
| 2010/0296285 | A1* | 11/2010 | Chemel | .................... F21S 2/005 362/235 |
| 2013/0107245 | A1* | 5/2013 | Covaro | ................ G08B 13/191 356/51 |
| 2015/0382436 | A1* | 12/2015 | Kelly | ..................... G08C 17/02 315/131 |
| 2017/0215252 | A1* | 7/2017 | Wells | ................. H05B 37/0218 |

\* cited by examiner

*Primary Examiner* — Don Le
(74) *Attorney, Agent, or Firm* — Clifford H. Kraft

(57) ABSTRACT

A system and method that uses a tag-driven network architecture controlled by one or more central controllers. Unique tags are associated with various system components such as remote switches, sensors and other peripherals. A tag is assigned to a node when the node is first entered into the network. A distributed policy creates relationships between tags of various different equipment. The tag typically defines what the policy is for a particular local node. The node executes the policy that is supplied in its tag by accessing a recipe associated with that tag. If a device is not working, other similar devices can take over its task simply by executing the recipe associated with the failed device's tag instead of their own.

18 Claims, 6 Drawing Sheets

AUTONOMOUS DISTRIBUTED LIGHTING SYSTEM

BACKGROUND

Field of the Invention

The present invention relates generally to lighting systems and more particularly to an autonomous distributed LED lighting system.

Description of the Problem Solved

In the past few years, LED-based lighting systems have greatly increased the energy efficiency of commercial and industrial establishments. These improvements have opened opportunities to produce improved comfort and to increase productivity. Various methodologies and designs have been created to simplify the complex requirements of operating such systems.

Parts of lighting systems known in the art may be connected via a network with a central controller having a menu of operation or behavior for each part of the system. Typically, independent lights in different rooms or locations can be controlled directly by a central controller. Presence or room occupation detectors can be placed on the network to notify the controller which rooms or locations are occupied and which are not. In some cases, the occupation detectors work only locally with the particular light unit in a location proximate to the detector; in other cases, the sensors communicate directly with the controller. Networks known in the art can be wired or wireless, with wired networks using so-called CAT-5 or CAT-6 cables or the like. In all cases, all devices in the network must be powered. This is either by supplying local building power to a device, or by providing separate power cables to each device. In summary, most modern lighting systems consist of sensors to collect information, fixtures to illuminate, power supplies to supply the energy, cabling to transfer the energy, data and commands and other components to enhance the user experience.

One of the problems with present day lighting systems is that if a particular location becomes unable to communicate with the central controller, it cannot necessarily continue to perform all of its functions since it relies on commands from the controller. Another problem is with backup power. Most local light units contain an internal backup power supply that is typically connected to building power wiring. During a power loss situation, a local unit typically operates from an internal battery, usually at reduced output intensity to save charge. Batteries are normally charged from line power through charging power supplies in the local units. This powering scheme requires every local unit to be located near, and wired into, building power.

It would be advantageous to have a distributed LED or other lighting system on a network where each node or location is capable of operating autonomously, with or without communication with a central controller, while still performing policies dictated by one or more central controllers. It would also be advantageous to have local lighting nodes that could charge their batteries without being connected to building line power.

SUMMARY OF THE INVENTION

The present invention relates to a distributed lighting system connected to one or more central controllers via a network. The network may be wired or wireless, and may use one of many known network communication protocols or it can use a proprietary protocol. The distributed system of the present invention includes lighting and sensor elements that are self-driven and independent of the central control, but yet respond to global requirements and policies from the central controller that are determined by the user.

The present invention relates to a system and method that uses a tag-driven network architecture controlled by one or more central controllers. Unique tags are associated with various system components such as remote switches, sensors and other peripherals. A tag is assigned to a node when the node is first entered into the network. A distributed policy creates relationships between tags of various different equipment. The tag typically defines what the policy is for a particular local node. The node executes the policy that is supplied in its tag by accessing a recipe associated with that tag. For example, a wall switch may turn a light fixture fully on during the morning and then dim the same fixture in the afternoon according to a recipe associated with its tag. This can occur even if the central control system is not operational, or power has been lost. The central controller will be notified of all the actions taken once it is operational again. Also, if a device is not working, other similar devices can take over its task simply by executing the recipe associated with the failed device's tag instead of their own.

Finally, the present invention allows charging of backup batteries by variable voltages found near the device or supplied from LED drive voltages.

Thus, an object of the present invention is a lighting control system where the controlling components work independently of a central control system using a tag system where only an event tag is needed to control the entire sequence of events. These sequences may be of any kind.

A further object is that if a particular device fails, another similar device can take over its function by executing events associated with the failed device's tag.

A further object is a lighting control wherein the sequence of actions to be taken by a node is stored locally, so that loss of communication with the central controller is not required for proper function.

A further object is a lighting control system wherein information about people traffic and other types of sensory information is stored locally at nodes and also broadcasted to other nodes or a central controller so there are multiple copies of this information in the system.

A further object is a lighting control system wherein a virtual copy of all physical devices and functionality can be simulated and compared to actual reports by the controlling devices. Thus, a diagnostic system can identify failures and allocate other devices to take over the task of an identified failed device.

Figure 1:
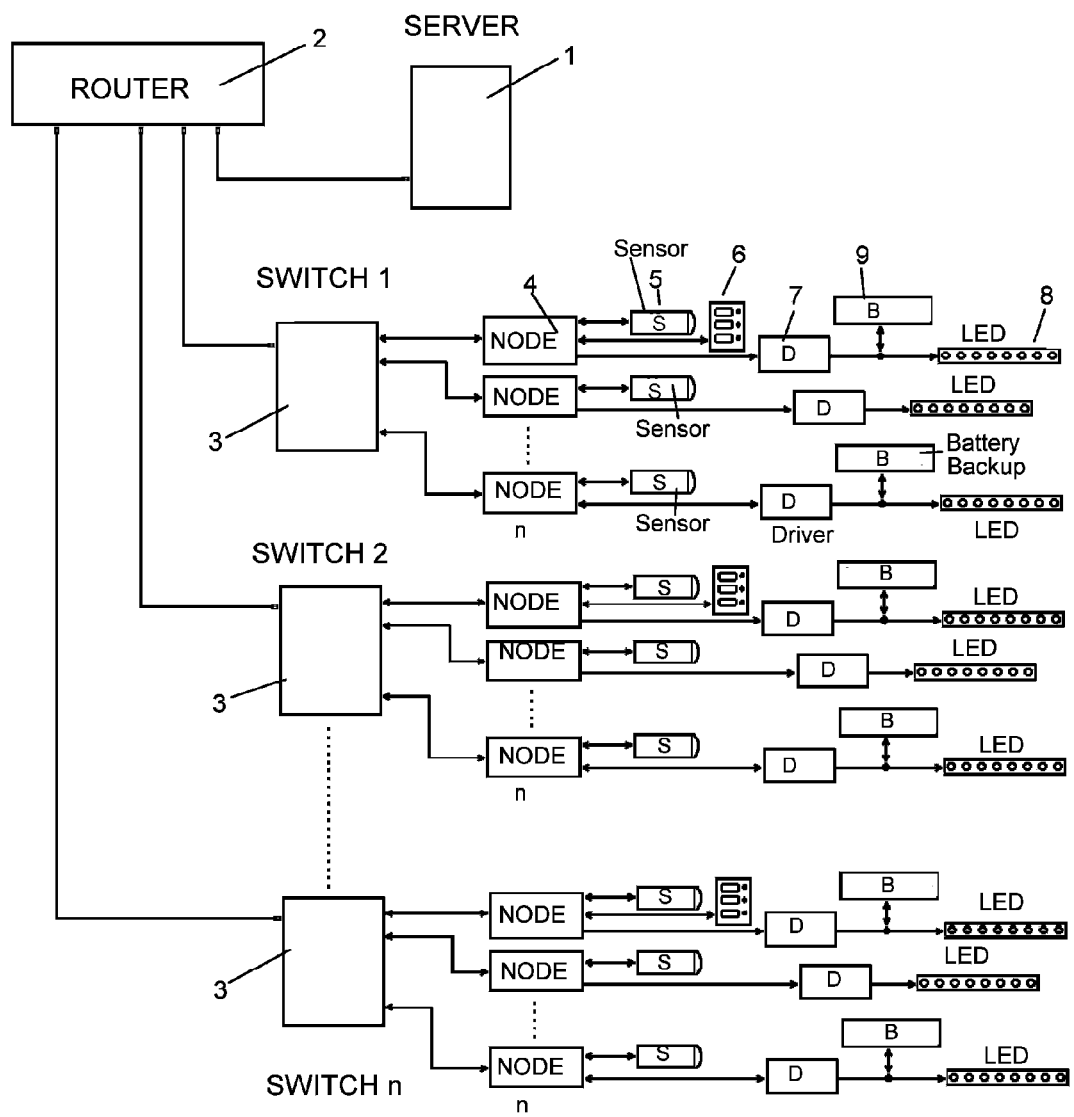
FIG. 1 is a block diagram of an embodiment of a representative system according to the present invention.

Several illustrations and figures have been presented to aid in understanding the present invention. The scope of the present invention is not limited to what is shown in the figures.

DESCRIPTION OF THE PREFERRED EMBODIMENTS

The present invention relates to a system and method that uses a tag-driven network architecture controlled by one or more central controllers. Unique tags are associated with various system components such as remote switches, sensors and other peripherals. A unique tag is assigned to a node when the node is first entered into the network. A distributed policy creates relationships between tags of various different equipment. The tag typically defines what the policy is for a particular local node.

A tag is any unique identification that can be related to a physical node or peripheral in a network. A node is an addressed location on the network that can communicate over the network with the central controller and with other nodes. A node may have several peripheral devices connected to it that may or may not be capable of communicating directly over the network. Regardless of how the peripherals communicate (either directly or via their node), these peripherals generally receive and store the same tag as the node they are connected to. Some peripherals may be "dumb" and unable to communicate over the network. This type of device is driven either by a node or by another peripheral.

A tag can be a simple numerical or alphanumerical code of several numbers or letters or combinations such as a serial number. However, unlike a serial number, which always belongs to a particular hardware component, a tag is normally assigned by the central controller when the node or peripheral is brought onto the network the first time. This is a form of device registration. The new tag is then sent to the node or peripheral where it becomes its unique identification. It should be noted that the tag and the network address are distinctly different. The tag remains with a device no matter what its network address. Peripherals can carry the same tag as the node they are connected to in some embodiments, or they can be assigned their own unique tags. The central controller associates a tag with one or more stored recipes in a central database relating to the desired functions of the tagged node and its peripherals or a tagged peripheral. Typical controller systems can be supplied with several default recipes relating to expected behavior of typical nodes or peripherals. Any number of additional recipes can be created and entered either before delivery, or more typically on-site by users or site installers. Recipes can typically be changed by a system administrator. Sets of recipes can be grouped in the controller based on different types of nodes or peripherals. In some situations, it may be desirable to have a base set of recipes that cannot be altered by users as well as recipes that can be changed. This option allows easy return to a baseline system if necessary.

Once a tag is assigned to a new node or peripheral, and the controller has associated one or more recipes with that tag, both the new tag and the associated recipe or recipes are transmitted to the node or peripheral where they are locally stored. Subsequently, that node or peripheral can autonomously execute instructions from its locally stored recipe(s) if it cannot communicate with the controller or even in case where it can communicate as will be explained. To facilitate autonomous operation and startup even before a node or peripheral has been registered, the node or peripheral can typically contain a stored default tag and one or more default recipes associated with that tag. When the node or peripheral is registered into the system, the default tag and recipes change as described.

An example of the process is as follows: once a new node or peripheral is connected to the network, an automatic request for a tag is generated and broadcast over the network. The controller, upon receiving this request, registers the new node or peripheral by assigning a new tag to it. If the device requesting registration is a node, the controller can supply a unique tag number to the node and to all of its peripherals. The tags supplied to the peripherals can be identical to the tag supplied to the node, or in other embodiments, each peripheral can receive its own unique tag. The tag or tags may also be supplied to the peripherals directly or by the node rather than directly over the network. From then on, there is no need to re-register even if the node or one of its peripherals is disconnected from and re-connected to the network.

When one of a node's peripherals is relocated to a different node, both the original node, the new node and the controller will be aware of the change. The peripheral's original tag and recipe (and hence functionality) stays intact at the new node. Hence, the peripheral continues to perform its original recipe in the new location. Only if the administrator decides to clear the tag allocated to the peripheral will the peripheral need to re-identify itself and receive a new tag and new recipe. The administrator can clear any node's or peripheral's tag at any time.

In an embodiment of the invention, a particular node also stores locally recipes associated with other node's tags identified in a local database by the other node's tag. The central controller can cause the particular node to execute the other node's recipe by simply sending the tag number of the other node to the particular node along with a command to execute according to the other node's tag. This can be very useful when a node fails and another node is commanded to "fill in" for it by executing the other node's recipe instead of its own.

Turning to FIG. 1, a block diagram of a representative system can be seen. A central controller 1, which can be a server, is connected to a network through any number of routers and/or switches 2. Power switches 3 are distributed throughout a single building, complex of buildings, campus or any other location needing lighting. These may be wall switches to control lights, or they simply may be network switching points. Power switches 3 usually control groups of different lights and/or sensors by having any number of nodes connected to them. The power switches 3 in FIG. 1 are shown connected to multiple nodes 4 which are in turn are connected to various sensors 5, switches 6, and LED drivers or other light drivers 7 which are in turn connected to LED circuit boards, lights or light strips 8. Battery backup nodes 9 can also be attached into the LED circuit boards 8 for operation during power failures. While the arrangement of FIG. 1 represents the preferred embodiment, in other embodiments, nodes can be connected directly to the network as can individual sensors and lighting elements if they are able to communicate over the network.

In the embodiment of FIG. 1, every power switch 3 can be connected to one or more nodes 4. These nodes in turn are the interfaces to a number of peripherals as described above. According to a particular embodiment, a copy of all the recipes for a node is stored locally in that node. This allows the node to work independently of the controller which results in much faster response from the node, especially if the network is busy. For example if a sensor 5 detects motion, it can immediately notify its connected node 4. The node then uses a tag, either its assigned tag or the tag of the sensor, along with the data about the event to look up a recipe in its local recipe database. If a recipe is found, the node will immediately perform the task associated with the tag. Concurrently it notifies the central controller of the event and the action taken. The controller will then look for the tag in its database and it will notify other nodes if such a requirement appears in the recipe associated with the tag. This way, a single sensor event can cause several different nodes to respond in various ways according to recipes associated with a node tag.

FIG. 1 shows a system where a group of nodes 4 are driven by a single power switch 3 with peripherals such as sensors, LED drivers and switches that do not themselves directly communicate over the network with the central controller and do not have separate tags. Each node 4 has a tag and at least one associated recipe. In an alternate embodiment, some of the individual peripherals such as occupancy sensors can have their own tags and their own recipes.

Figure 2:
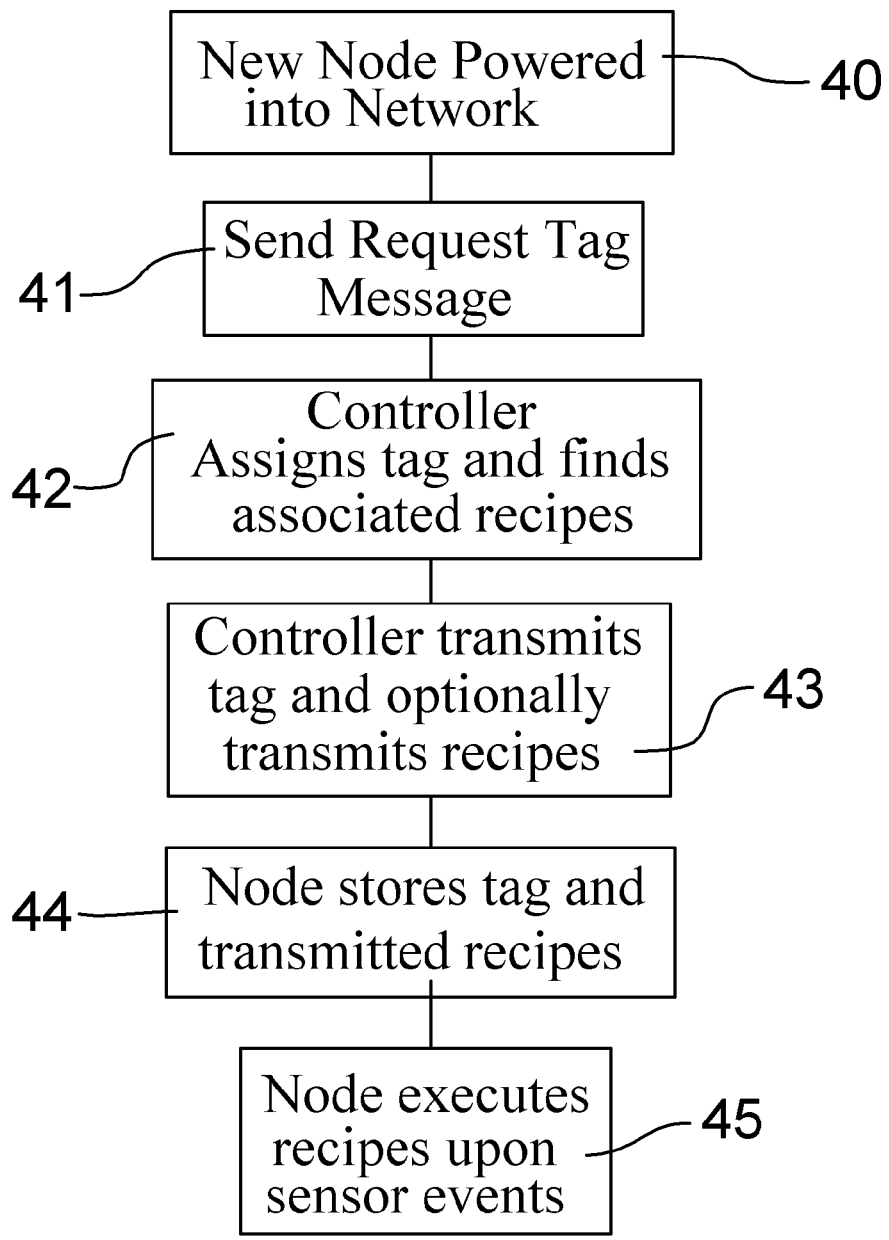
FIG. 2 is a flow diagram of an initial tag assignment.

FIG. 2 shows a flow diagram of a initial tag assignment in a system where each node and/or each peripheral has is own tag. A node is attached to the network and powered up 40. A request for tag message is then transmitted 41 from the node to the central controller. The controller generates a new tag and associates 42 recipes from its database with the new tag. These recipes can be based on the type of node registering or on the set of peripherals attached to it. The new tag and the set of recipes are then sent 43 to the node. The node stores 44 the new tag and any transmitted recipes. From then on, the node executes 45 the recipes associated with its tag upon sensor events. Registration of each attached peripheral then occurs in the same manner. If a peripheral is already registered, that data is entered into the database at the controller.

Figure 3:
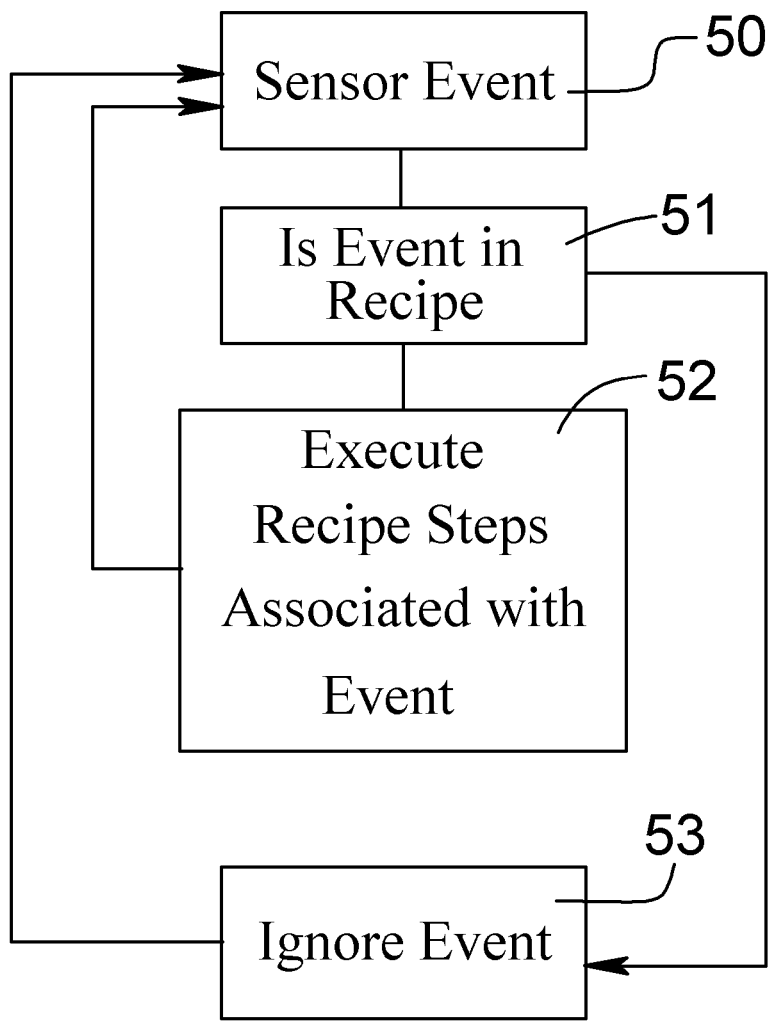
FIG. 3 is a flow diagram of a sensor action.

FIG. 3 shows a flow diagram of a sensor event. A sensor detects 50 a change in its environment such as motion in a room. The sensor sends this data along with its tag (if it has its own tag) to the node. The node looks for 51 the sensor tag in its local database. If it is found, the associated recipe is executed 52 by the node by issuing commands to other peripherals attached to the node. For example, the lights in the room can be turned on to a brightness level determined by the time of day. The node can take this action without any command from the central controller. However, as long as there is communication with the central controller, the node notifies the controller of the event sensed and the action it has taken. The central controller can find the correct recipe in its database based on the tag number and thus notify any other affected nodes if further action is needed. If it turns out, that the event is somehow not found, it is ignored 53.

Figure 4:
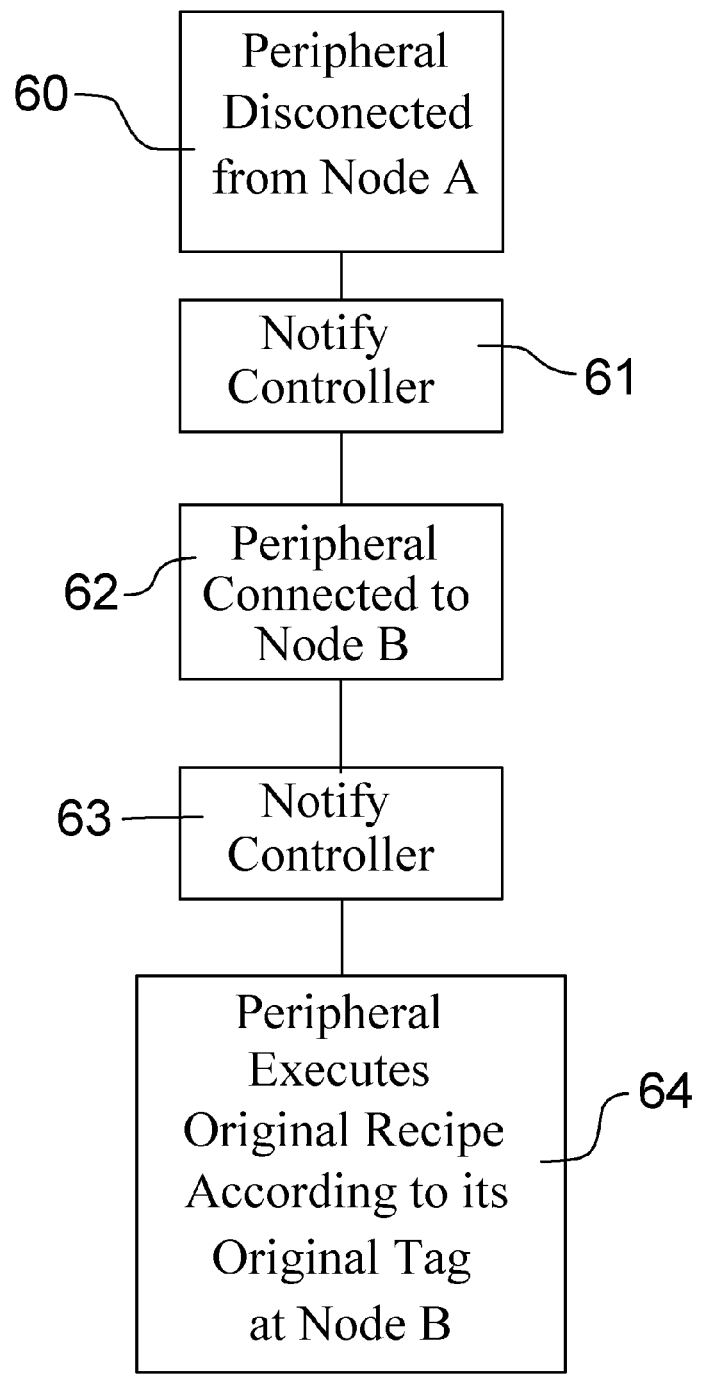
FIG. 4 is a flow diagram of a peripheral being attached to a different node.

FIG. 4 shows a flow diagram of a case when a "smart" peripheral is relocated from one node to another, or where a node is moved in the network along with its connected peripherals. First the device is disconnected 60 from its present location. The node or switch it was attached to senses this event and sends 61 a message to the central controller. The central controller adjusts an entry in a central configuration table or the like and removes the peripheral's tag from an active tag list. Next the peripheral is connected 62 to a different node. The peripheral, upon powering up, notifies 63 its associated node and hence the central controller, of its tag. The central controller updates the central configuration table and reactivates the peripheral's tag as being active and attached to the new node. The peripheral, when commanded, will execute 64 the policy stored in its associated recipe. This recipe can be stored in the peripheral itself, or in both the old and new nodes. As previously stated, an administrator can change that peripheral's tag if it is desired that it execute a different recipe.

Communication on the physical network cabling can optionally be divided into a data portion and a power portion. During the power portion, no data is transmitted, but rather a fixed voltage appears on the network cable. This voltage can be used to charge batteries and also to power peripherals. Alternatively, the data on the network wiring can be biased at a fixed DC level that can be used for charging and powering.

Figure 5:
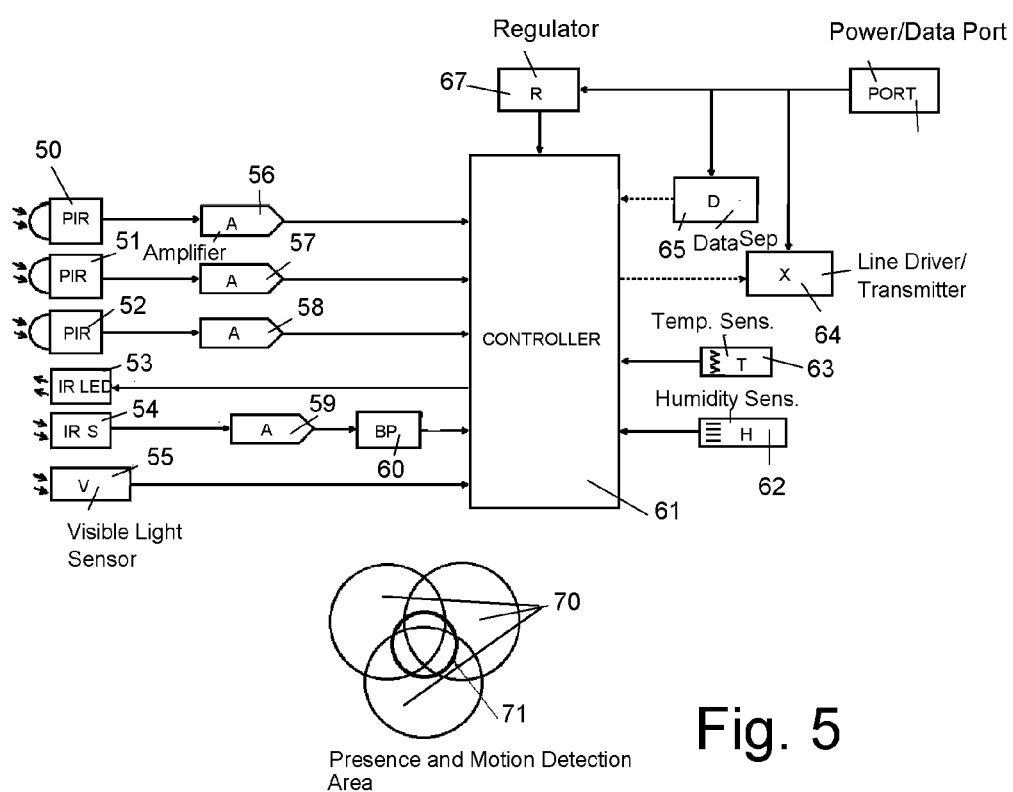
FIG. 5 is a block diagram of an embodiment of a presence sensor.

Turning to FIG. 5, a block diagram of a particular type of sensor can be seen. This is an occupancy sensor that detects if a room is occupied or not. This type of sensor is commonly attached to nodes in the network previously described. This is typically a "smart" sensor in that it contains an internal processor or controller 61 and communicates directly over the network (usually via a node that it is attached to). It has a unique tag and executes a unique policy determined by its recipe. It stores a local copy of its recipe as well as other recipes as determined by the system configuration.

Power and data is received at a power/data port 66. A regulator 67 stores energy during the power portion of the power/data transition as well as supplying power all sub systems. A data separator 65 extracts data sent to the occupancy sensor during a data portion of a transmission. A line driver/transmitter 64 sends information supplied by controller 61 back to the network.

There are three passive infrared sensors (PIR) 50, 51 and 52 follower by three amplifiers 56, 57 and 58. These PIRs are arranged to have a triangular foot print of the three larger circles in the coverage diagram 70. Having three sensors substantially increases the detection area and allows detection of motion as follows:

If only one PIR detects motion, the event will be ignored as noise or not relative to this sensor. If at least two PIRs detect motion within a particular time interval, then motion is detected, and depending on the order of detection, the direction of motion can be inferred. If all three PIR sensors detect motion, the active IR LED light source 53 transmits a AC signal of varying strength. A preferred frequency for this transmission is 40 kHz; however, any frequency is within the scope of the present invention.

An infrared (IR) detector circuit having an IR sensor 54, an amplifier 59 and a bandpass filter 60 centered at the transmit frequency detects, amplifies and isolates this signal. The bandpass filter 60 typically has a passband wide enough to detect a reflected signal from a person moving rapidly, yet narrow enough to reject noise. Other types of filters are also within the scope of the present invention including, but not limited to, combinations of low pass and high pass filters. The controller 61 can then use this information to distinguish whether this motion was caused by a single person or multiple persons using internal pattern recognition or other algorithm.

Using the passive PIR sensors, that consume very little power, followed by an active infrared system, that consumes much higher power, has the benefit of minimizing the power consumption while also being able to reduce the occurrence of false triggers inherent in simple PIR sensors.

An optional visible light sensor 55, which has the smaller circular viewing area 71 in coverage diagram 70 can also used for gesture detection. For example, during activation of a light fixture, a person may simply wave a hand to indicate to the network they are trying to identify a specific light fixture. This feature is very useful during the commissioning and setup process. The visible light sensor 55 can also be used activate daylight savings and to produce constant illumination regardless of the ambient outdoor lighting condition.

Other optional sensors, such as a temperature sensor 63 and a humidity sensor 62, can be used to collect information about the ambient room conditions which can be transmitted over the network to the central controller.

Figure 6:
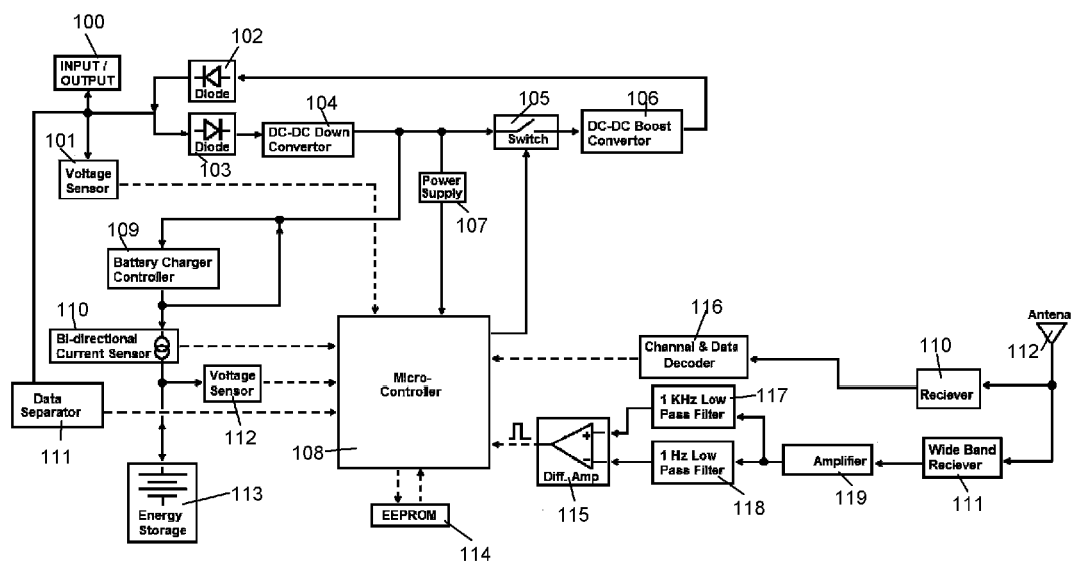
FIG. 6 is a block diagram of an embodiment of a battery charging source.

FIG. 6 shows a block diagram of a power backup system and battery charger that takes power directly from LED drivers to charge batteries and provide self-powering for the charger logic. The charger may be a "smart" peripheral that can communicate over a network, or it may be passive. The input voltage from an LED driver is connected to the input port 100. In the case of a network, a data separator 111 supplies data from a special LED driver to a controller 108 that executes stored instructions stored in a memory. Typically, data from the network is used to notify the controller 108 that line power has been lost, or that line power has been restored.

Power from an LED driver is received and delivered by the input port 100. LED drivers are usually based on a constant current design, which means they will supply a fixed current to one or more LED boards, and hence may have a variable voltage. A voltage monitor 101 is used to sample the input voltage and make the value available to the controller 108. The controller keeps track of the voltage on the input port and remembers (stores) the maximum value ever measured. Meanwhile, periodically, the stored value of the maximum voltage is reduced by a learning coefficient. It typically takes several days for the learning coefficient to reduce the maximum value to a predetermined minimum value if there are no new higher readings. Using this technique, the device adapts to any voltage from a nominal minimum to a nominal maximum. These nominal values may be changed by a user to match specific applications.

Operation is as follows: the input diode 103 is turned on if LED drive voltage is present at the input. The DC-DC converter 104, along with a charge controller 109 is used to properly charge the battery or other energy storage device (such as a capacitor) 113. The DC-DC down-converter 104 is typically necessary because the LED drive voltage to an LED printed circuit board is usually higher than the voltage needed to charge the battery 113 or other storage device. The circuit of FIG. 6 redirects a small amount of this current destined for the LEDs to charge the energy storage system 113 and to operate the device. This amount should be less than approximately 1% of the total power supplied to the LEDs. This small amount is not be noticeable by room occupants.

A bidirectional current monitor 110 measures the charge and discharge currents to and from the energy storage system 113. Since, as stated, backup systems are typically required to produce some percentage such as 25% of the power normally supplied to the fixture during power outages, there must be a mechanism to measure the current supplied to the LED fixture (the load). The first time power is lost, a device turn-on switch 105 enables a DC-DC booster 106. The DC-DC booster 106 generates the same voltage as the peak voltage previously measured. Current flows back into the system to the LEDs from the DC-DC booster 106 through the diode 102. The current monitor 110 is used to keep track of the current taken from the battery or energy storage system required to produce this voltage. The actual voltage at the energy storage system 113 is reported to the controller 108 by a voltage sensor 112. By dividing the ratio of the voltage at the energy storage measured by the voltage sensor 112 by the voltage measured at the input port by another voltage sensor 101, and knowing the efficiency of DC-DC boost converter 106, it is possible to calculate the LED load current. This value is stored in a memory 114 that can be an EEPROM or other memory device and can be used to properly generate the percentage nominal current value needed by the LEDs during the power loss condition. Power loss and power restoration is detected using different methods for different applications.

There are at least three cases of power loss detection. Cases 1 and 2 are typically used when the charger is used separate from a tag network. Case 3 is more typically used with the tagged network of the present invention.

Case 1:

A remote radio transmitter is connected to the uninterrupted building power line in the vicinity of the backup system. This transmitter may operate on an ISM band or on a licensed frequency. A preferred frequency is 433 MHz; however, any other frequency may be used. When line power is lost, this transmitter can transmit a signal reporting the status of the power line. This signal is received by an antenna 112, converted by an RF receiver 110 and decoded by the channel and data decoder 116 and passed to the controller 108. Upon verification of the data integrity, the turn-on switch 105 is turned on, and the DC-DC booster 106 is enabled. The current measured by the bidirectional current sensor 110 is used to generate a constant current corresponding to the fixture requirement as described above. Power restoration is also reported over the radio link.

Case 2:

If a remote RF transmitter is not feasible due to long distance or other issues, then a low data rate wireless power-loss detection system can be used. This is a system that sends low frequency modulated data. Radio frequency information is received by the antenna 112 and is converted to an AC signal by a wide-band receiver 111. A detected signal is amplified by an amplifier 119 followed by two separate low pass filters with cutoff frequencies of 1 Hz 118 and 1 KHz 117. A differentiator 155 compares the two filtered AC signals and generates a single pulse representing loss of power, and a reverse polarity pulse when power is restored. This information is then used to generate constant current as described in Case 1.

Case 3:

In networked lighting applications such as the tagged network of the present invention, the driver driving the LED load is always powered; however, the driver only generates the constant current when commanded by the system. A special LED driver can be designed to transmit a data packet on the LED drive to the charger line indicating low voltage upon the loss of power to the LED driver. This signal is received by data separator the 111 and decoded by the controller 108. As case 1 and 2, a constant current is generated. Upon power restoration, a different command is sent in order to stop the backup process.

SUMMARY

The present invention relates to a distributed lighting system that includes a plurality of building lighting nodes on a network in communication with a central controller, where at least one node is electrically connected to a plurality of peripherals, and at least one of the peripherals is an LED or other lighting device. Another of the peripherals is typically a sensor, usually an occupancy sensor. Each node has a unique tag assigned to it by the central controller, and each unique tag is associated with at least one recipe stored locally at the node and remotely at the central controller. The recipe commands a plurality of actions to be taken by the node or peripheral in response to a one or more sensor or switch events, or one or more commands from the central controller. Any node or peripheral can operate autonomously according to its tag and associated recipe without communication with the central controller, and if a peripheral or node is moved to a new location in the network, the peripheral or node retains its original tag and executes the recipe associated with that original tag regardless of its location in the network.

One of the sensor types can be an occupancy sensor that includes three passive infrared sensors (PIRs) arranged with a coverage area of an approximate triangle in a occupiable space, along with an active IR motion detection sensor including an infrared light source and an infrared detector driving a filter constructed to detect motion in the occupiable space, where the active IR motion detection sensor is activated when the two of the PIRs detect motion. A processor can report occupancy when the active IR motion detector also detects motion in the space.

The invention also includes a backup charging system that can use a variable voltage found on LED drive lines.

It should be noted that the term controller or processor used in this application means any circuit or device capable of performing logic or computations including a wired logic circuit, a microcontroller, a microprocessor, a laptop, desktop, server, a smartphone, a pod computer and any processor that can execute stored instructions from a memory. Database means any storage of data on any computing device including a server, desktop computer or any other computer. Network means any wired or wireless means of transmitting data from one point to a point remote from the first point.

Several descriptions and illustrations have been provided to aid in understanding the present invention. One with skill in the art will realize that numerous changes and variations may be made without departing from the spirit of the invention. Each of these changes and variations is within the scope of the present invention.

We claim:

1. A distributed lighting system comprising:
a plurality of building lighting nodes on a network in communication with a central controller, at least one node being electrically connected to a plurality of peripherals, at least one of the peripherals being an LED lighting device, and at least one peripheral being a sensor or a light switch;
wherein each node includes a local processor and has a unique tag assigned to it by the central controller, and each unique tag is associated with at least one recipe stored locally at the node and executable by the local processor as well as also being stored remotely at the central controller, the recipe being a set of steps commanding through the local processor a plurality of actions taken by the node or peripheral in response to a one or more sensor or switch events or one or more commands from the central controller;
the system being constructed so that any node or peripheral can operate autonomously according to its tag and associated recipe without communication with the central controller;
the system also being constructed so that if a peripheral or node is moved to a new location in the network, the peripheral or node retains its original tag and its local processor executes the recipe associated with that original tag regardless of its location in the network.

2. The distributed lighting system of claim 1 wherein the central controller can change the tag assigned to any node and can assign or modify any recipes associated with that tag.

3. The distributed lighting system of claim 1 wherein nodes can store copies of other node's tags and associated recipes as well as their own, and can execute those other recipes if they receive a command from the central processor ordering them to execute the associated recipe related to the other node's tag.

4. The distributed lighting system of claim 3 wherein the node continues to execute according to the other node's tag when communication with the central controller is lost.

5. The distributed lighting system of claim 1 wherein a new node or peripheral requests to be assigned a tag when it is first powered into the network.

6. The distributed lighting system of claim 5 wherein the central controller upon receiving the request to be assigned a tag from the new node or peripheral assigns a tag, transmits the tag to the new node or peripheral and optionally transmits one or more recipes to the new node or peripheral.

7. The distributed lighting system of claim 1 wherein some of the sensors are occupancy sensors.

8. The distributed lighting system of claim 1 wherein at least some of the LED lighting devices are equipped with backup power devices.

9. The distributed lighting system of claim 8 wherein at least some of the backup power devices derive charging current for an energy storage device from LED drive voltage.

10. The distributed lighting system of claim 7 wherein the occupancy sensors combine inputs from three passive IR sensors combined with an active IR motion detection system.

11. The distributed lighting system of claim 10 wherein the occupancy sensors also include a visible light sensor processed to detect gestures.

12. A distributed building lighting system comprising:
a plurality of nodes on a network in communication with a central controller, each node being electrically connected to one or more occupancy sensors and one or more LED lighting devices, each node having a unique tag ID assigned by the central controller when the node is first powered into the network, each tag ID being associated both at the node and at the central controller with a recipe of responses to sensor events, the recipe being executable by a local processor in the node;
wherein, the sensor events include sensing occupancy in a room by one or more persons, the recipes including at least activating lights, deactivating lights and dimming lights, wherein the recipe may include adjusting brightness of a particular light based on time of day and outside ambient conditions;
and wherein when a node is moved to a new location in the network, it retains its original assigned tag and continues to execute recipes on its local processor according to that original assigned tag.

13. The distributed lighting system of claim 12 wherein nodes can store copies of other node's tags and associated recipes as well as their own, and can execute those other recipes if they receive a command from the central processor ordering them to execute the associated recipe related to the other node's tag.

14. The distributed lighting system of claim 12 wherein at least some of the LED lighting devices are equipped with backup power devices.

15. The distributed lighting system of claim 14 wherein at least some of the backup power devices derive charging current for an energy storage device from LED drive voltage.

16. An occupancy sensor for use in a network lighting system comprising:
- first, second and third passive infrared sensors (PIRs) arranged with a coverage area of an approximate triangle in a occupiable space;
- an active IR motion detection sensor including an infrared light source and infrared detector driving a bandpass filter constructed to detect motion in said occupiable space, the active IR motion detection sensor being activated when the two of the PIRs detect motion;
- a processor executing instructions from a memory device, said instructions activating the active IR motion detection sensor when at least two of the PIRs detect motion and reporting possible occupancy of the occupiable space when the active IR motion detector also detects motion in the space.

17. The occupancy sensor of claim 16 wherein the active IR motion detector is operated at approximately 40 kHz.

18. The occupancy sensor of claim 16 further comprising a temperature sensor and a humidity sensor.

* * * * *